United States Patent [19]

Heister

[11] Patent Number: 5,105,912

[45] Date of Patent: Apr. 21, 1992

[54] PORTABLE BATTERY-POWERED GREASE GUN

[76] Inventor: Michael J. Heister, 13588 Washington Mills Rd., Bernard, Iowa 52032

[21] Appl. No.: 625,756

[22] Filed: Dec. 11, 1990

[51] Int. Cl.⁵ ............................................. F16N 5/02
[52] U.S. Cl. .................. 184/105.2; 184/27.1; 222/262; 222/333
[58] Field of Search ........ 184/105.2, 105.1, 38.1–38.3, 184/32, 36, 27.1, 41, 45.1; 222/333, 326, 327, 256, 262, 263, 258, 261

[56] References Cited

U.S. PATENT DOCUMENTS

| | | | |
|---|---|---|---|
| 1,659,950 | 2/1928 | Goodman | 222/326 |
| 2,123,712 | 7/1938 | Clark | 222/326 |
| 2,626,085 | 1/1953 | MacKinnon | 222/262 |
| 2,928,574 | 3/1960 | Wagner | 222/262 |
| 3,987,869 | 10/1976 | Bowers | 184/27.1 |
| 4,024,994 | 5/1977 | Davis, Jr. | 222/333 |
| 4,257,540 | 3/1981 | Wegmann et al. | 184/105.2 |
| 4,264,021 | 4/1981 | Davis, Jr. | 222/333 |
| 4,664,298 | 5/1987 | Shew | 184/105.2 |
| 4,706,848 | 11/1987 | D'Andrade | 222/333 |

FOREIGN PATENT DOCUMENTS

| | | | |
|---|---|---|---|
| 0663834 | 1/1988 | Switzerland | 184/105.2 |
| 0343003 | 11/1989 | United Kingdom | 222/326 |

*Primary Examiner*—Ira S. Lazarus
*Assistant Examiner*—Alan B. Cariaso
*Attorney, Agent, or Firm*—James C. Nemmers

[57] ABSTRACT

A hand-held grease gun that is battery-powered and fully portable. The grease gun uses a disposable cartridge filled with grease that is under pressure exerted by a spring loaded plunger. Grease from the cartridge is discharged into a chamber containing a piston to draw the grease from the cartridge into the chamber and discharge it through a nozzle whenever the trigger is actuated by the user.

4 Claims, 1 Drawing Sheet

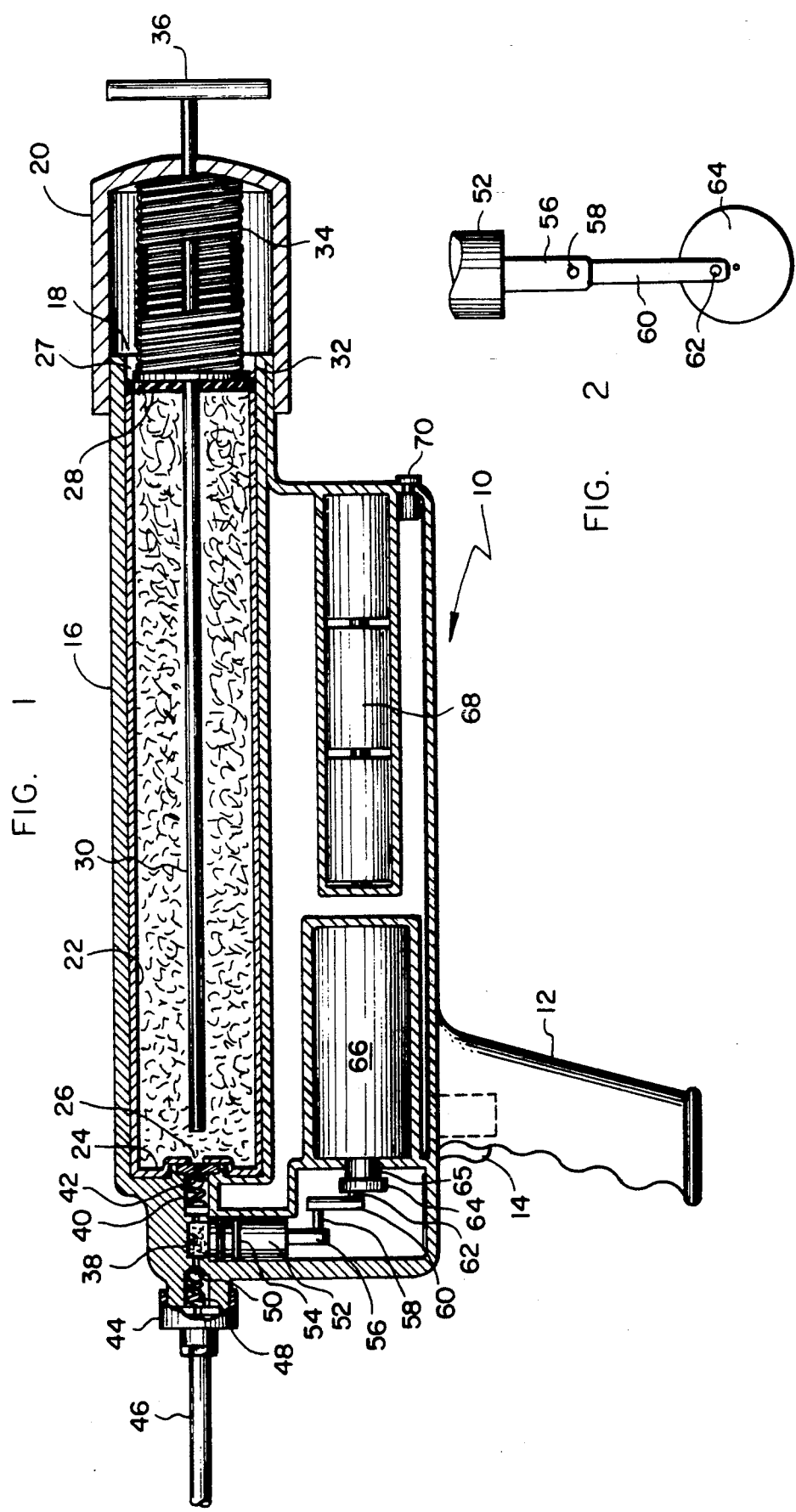

PORTABLE BATTERY-POWERED GREASE GUN

BACKGROUND OF THE INVENTION

Portable manually-operated grease guns are extremely useful in many situations, especially by farmers and others who work around machinery in the field as well as vehicle owners who wish to lubricate their own vehicles. These hand-held grease guns are easy to use, and with the development and availability of replaceable and disposal grease cartridges, the undesirable job of refilling the gun housing with grease is eliminated. With the use of the replaceable and disposable cartridges, a spring biased plunger discharges the grease from the cartridge into an area where a manually operated mechanism will force the grease through a discharge nozzle. A manually operated grease gun of this type is shown in U.S. Pat. No. 3,780,830. A similar hand operated grease gun which does not use replaceable cartridges is shown in U.S. Pat. No. 1,659,950.

Although the manually operated grease guns employ force multiplying mechanisms, the effort required to operate the mechanism to discharge the grease frequently requires considerable effort, and makes the use of these guns difficult in some instances. Moreover, some vehicles and equipment require considerable pressure to force the grease into the grease fitting.

There have been developed electrically supplied power-operated caulking guns such as those shown in U.S. Pat. Nos. 4,264,021 and 4,024,994. However, these guns can be used only where electric power is available, therefore rendering them useless for farmers in the field, for example. Battery operated power tools are currently known and used, such tools employing rechargeable batteries so that they can be used in the field. However, there is a need for a simple and inexpensive grease gun that is portable and battery-powered and which is relatively inexpensive so as to be available to a wide variety of users.

SUMMARY OF THE INVENTION

The grease gun of the invention consists of a housing that has a cylindrical shaped barrel for receiving a replaceable cartridge filled with grease. The cartridge is held in place by a removable cap containing a spring the exerts force on a plunger which pressurizes the grease in the cartridge toward the discharge end of the barrel. At the discharge end, there is a check valve which allows the grease to be forced from the cartridge but prevents its return. Grease in the cartridge is discharged into a chamber containing a piston that is driven through a crank arrangement by a battery powered motor. Operation of the motor is controlled by a trigger in a handle attached to the barrel. Discharge of the grease from the gun is through a check valve into a nozzle.

BRIEF DESCRIPTION OF THE DRAWING

FIG. 1 is a side elevational view, mostly in section, showing the interior workings of the grease gun of the invention; and FIG. 2 is an end elevational view of the drive arrangement for the motor driven piston that discharges the grease from the gun.

DESCRIPTION OF THE PREFERRED EMBODIMENT OF THE INVENTION

The grease gun of the invention has a housing 10 with a handle 12 containing a trigger 14 so that the grease gun can be easily handled in one hand by the user. The housing 10 includes a cylindrical shaped barrel 16 that has an open end 18 normally closed by a removable cap 20 which may be threaded on the open end 18 or held in place in any suitable manner so that it can be easily removed when desired.

The cylindrical shaped barrel 16 is designed to receive a replaceable grease cartridge 22 that has a discharge end 24 containing a discharge opening 26. Until use, the discharge opening 26 preferably contains a removable thin paper or plastic seal on its outer end, which seal would be removed before the cartridge 22 is inserted in the barrel 16. At the end 27 of the cartridge 22 opposite the discharge end 24, there is a closure 28 that is moveable inside of the cartridge. Closure 28 may be made of some material, such as relatively stiff rubber or plastic, which will form a fairly tight seal on the inside of the cartridge 22 to prevent the leakage of any grease from end 27 of the cartridge 22 during shipment, storage or use.

The removable cap 20 contains an elongated guide rod 30 and a plunger 32 slidable along the rod. The plunger 32 is biased along the rod 30 by a spring 34 seated inside of the cap 20 between the end of cap 20 and the plunger 32. A handle 36 is preferably provided at the end of the rod 30 outside of the cap 20 to facilitate insertion of the rod 30 inside of the cartridge 22 into the position shown in FIG. 1 after the cartridge 22 has been inserted into the barrel 16. Thus, with the cartridge 22 contained inside of barrel 16 and the cap 20 in place, the spring 34 will exert force against plunger 32 to force the closure 28 against the grease in the cartridge 22 and thereby force it through the discharge opening 26.

The housing 10 has at its discharge end a chamber 38 that communicates with the discharge opening 26 of the cartridge 22 through a passageway 40 that may contain a spring-loaded check valve 42. Because of the pressure exerted by plunger 32 against the grease in the cartridge 22, check valve 42 may not be necessary. However, if used, the check valve 42 will permit the grease to flow from the cartridge 22 into the chamber 38 and prevent any return flow of grease back into the cartridge 22 through opening 26.

The housing 10 also contains a discharge nozzle 44 that is adapted to be attached to a standard grease gun hose 46 or other suitable connection depending upon the use of the grease gun. Since grease in chamber 38 is under pressure, it will flow from chamber 38 through a discharge passageway 48 connecting chamber 38 to the discharge nozzle 44. Passageway 48 contains a spring-loaded check valve 50 which allows the grease to flow from chamber 38 into the discharge nozzle 44, but check valve 50 will prevent return flow of the grease.

In order to controllably allow the user to discharge grease from the gun, a piston 52 is moveable upwardly and downwardly in the chamber 38. Piston 52 preferably has a pair of O-rings 54 to seal the chamber 38 and prevent grease from bypassing the piston 52. Piston 52 is connected to a crank arm 56, the opposite end of which is connected by pin 58 to arm 60 which is in turn operatively connected by pin 62 to a drive wheel 64. Since pin 62 is connected to the drive wheel 64 at a point radially outwardly from the center of rotation of drive wheel 64, rotation of drive wheel 64 will cause reciprocating motion of piston 52. During one revolution of drive wheel 64 piston will move through a power stroke and a return stroke. Drive wheel 64 is driven by connection to the drive shaft 65 of a motor 66 which powers the drive wheel 64 at a low rpm. Motor 66 is powered by a battery pack 68 containing a rechargeable battery or batteries that may be connected through a recharger adapter 70 to a standard power supply whenever the batteries need recharging. Trigger 14 provides an on/-off switch to the motor 66.

In use, the user will insert a full grease cartridge 22 into the barrel 16, and will insert the rod 30 into the end of the cartridge 22 with the plunger 32 resting against the closure 28. The cap 20 is then locked onto the open end 18 of the barrel 16. Spring 34 will apply pressure to the grease contained in cartridge 22 forcing it through the discharge opening 26 into the chamber 38. When the user wishes to discharge grease from the discharge nozzle 44, the user merely presses the trigger 14 which will turn the motor 66 on and cause drive wheel 64 to turn through one revolution. This drives the piston 52 through a single power stroke to force the grease from the chamber 38 through the check valve 50 into the discharge nozzle 44. The piston 52 will then retract to allow grease to again fill chamber 38. If desired, the gun can be designed so that the motor 66 will run continuously as long as the user depresses trigger 14. In this event, when the desired amount of grease has been discharged from the discharge nozzle 44, the user releases the trigger 14, stopping the motor and stopping the discharge of grease from the discharge nozzle 44. When all of the grease has been discharged from the cartridge 22, the cap 20 can be removed, the cartridge discarded and a new cartridge inserted into the barrel 16.

From the foregoing description, it will be evident that I have provided a very simple, easy to use and inexpensive portable battery-powered grease gun. The portability of the grease gun will permit it to be used anywhere even though there is no source of electric power. This permits the grease gun to be used in the field by farmers and others. By providing for powered discharge of grease, pressure at the discharge of the grease gun sufficient for all applications is available. Also, by powering the grease gun, anyone can use the grease gun even though the user has little or no strength.

It will thus be obvious to those skilled in the art that although I have shown a preferred embodiment of the invention, various revisions and modifications can be made to the preferred embodiment disclosed herein without departing from the spirit and scope of the invention. It is my intention, however, that all such revisions and modifications as are obvious to those skilled in the art will be included within the scope of the following claims.

What is claimed is as follows:

1. A portable grease gun for dispensing grease from a replaceable cartridge, said grease gun comprising: a main body having forward and rearward ends and side walls defining a cartridge chamber for receiving the cartridge; a plunger sealingly engageable inside the cartridge and moveable from the rearward end toward the forward end of the cartridge chamber; the forward end of the cartridge chamber having an opening therein; means biasing the plunger toward the forward end of the cartridge; a discharge chamber having a discharge opening combined with the forward end of the gun for receiving grease from the cartridge through the opening in said forward end; a check valve between the discharge opening in the forward end of the chamber and the discharge chamber; a piston moveable toward and away from the discharge chamber to force grease in the discharge chamber through the discharge opening whenever the piston moves toward the discharge chamber; a check valve in the discharge opening to allow grease to be forced from the discharge chamber only out through the discharge opening; user-controlled battery-operated power means operatively connected to the piston for moving the piston; and a battery chamber located near the battery-operated power means, the power means and battery chamber are both being located below the cartridge chamber.

2. The grease gun of claim 1 in which the power means includes a battery-operated motor and a crank and arm arrangement for moving the piston.

3. The grease gun of claim 2 in which there is a handle combined with and extending downwardly from the main body, and a user-operated trigger is positioned on the handle to control operation of the motor.

4. The grease gun of claim 3 in which an elongated guide rod is extendible into and through the cartridge chamber and through the plunger and into a cartridge contained in the chamber so as to guide the plunger as it moves inside the cartridge, and the means biasing the plunger toward the forward end of the cartridge includes a spring.

* * * * *